(12) United States Patent
Mumtaz et al.

(10) Patent No.: US 9,294,146 B2
(45) Date of Patent: Mar. 22, 2016

(54) SYSTEM FOR TRANSMISSION OVER A MULTI-MODE AND/OR MULTI-CORE OPTICAL FIBER

(75) Inventors: Sami Mumtaz, Bois d'Arcy (FR); Ghaya Rekaya-Ben Othman, Antony (FR); Yves Jaouen, Paris (FR)

(73) Assignee: Institut Mines-Telecom, Paris (FR)

( * ) Notice: Subject to any disclaimer, the term of this patent is extended or adjusted under 35 U.S.C. 154(b) by 130 days.

(21) Appl. No.: 14/126,816

(22) PCT Filed: Jun. 22, 2012

(86) PCT No.: PCT/EP2012/062124
§ 371 (c)(1),
(2), (4) Date: Jul. 9, 2014

(87) PCT Pub. No.: WO2012/175697
PCT Pub. Date: Dec. 27, 2012

(65) Prior Publication Data
US 2014/0314410 A1    Oct. 23, 2014

(30) Foreign Application Priority Data

Jun. 23, 2011 (FR) ..................................... 11 55537

(51) Int. Cl.
*H04B 10/12* (2006.01)
*H04J 14/04* (2006.01)
(Continued)

(52) U.S. Cl.
CPC .............. *H04B 3/32* (2013.01); *H04B 10/2581* (2013.01); *H04J 14/0298* (2013.01); *H04J 14/06* (2013.01); *H04L 27/2627* (2013.01); *H04L 27/2649* (2013.01); *H04L 27/2697* (2013.01)

(58) Field of Classification Search
CPC ..................... H04B 10/2581; H04L 27/2627

USPC .................................................. 398/65, 44, 43
See application file for complete search history.

(56) References Cited

U.S. PATENT DOCUMENTS 7,643,760 B1    1/2010  Han et al.
8,582,933 B2 *  11/2013 Ryf .................... H04B 10/2581
                                          385/29
(Continued)

FOREIGN PATENT DOCUMENTS

FR          2930861 A     11/2009

OTHER PUBLICATIONS

Alamouti, S.M., Oct. 1998, A simple transmit diversity technique for wireless communications, IEEE Journal, 16(8):1451-1458.
(Continued)

*Primary Examiner* — Oommen Jacob
(74) *Attorney, Agent, or Firm* — Knobbe, Martens, Olson & Bear, LLP

(57) ABSTRACT

A transmitter for an optical telecommunication system on a weakly multimode fiber is disclosed. One aspect is a transmitter including an encoder transforming each block of symbols to be transmitted into a code matrix, each element of the matrix being relative to a time of use and to a propagation mode of the weakly multimode fiber. The transmitter can include a plurality of modulators respectively associated with the different propagation modes, each modulator modulating a laser beam during a time of use. Each modulator can modulate a laser beam by use of an element of the corresponding matrix, the elements of the matrix of the code being subjected beforehand to an OFDM modulation upstream of said modulators. Each of the modulated beams can be input into the weakly multimode fiber to propagate therein according to a separate mode.

14 Claims, 12 Drawing Sheets

(51) Int. Cl.
*H04J 14/00* (2006.01)
*H04B 3/32* (2006.01)
*H04B 10/2581* (2013.01)
*H04J 14/06* (2006.01)
*H04J 14/02* (2006.01)
*H04L 27/26* (2006.01)

(56) References Cited

U.S. PATENT DOCUMENTS

| | | | |
|---|---|---|---|
| 2003/0123877 A1 | 7/2003 | Lo | |
| 2004/0004755 A1 | 1/2004 | Roberts et al. | |
| 2007/0122153 A1 | 5/2007 | Tamai | |
| 2009/0324224 A1 | 12/2009 | Xie | |
| 2010/0021163 A1* | 1/2010 | Shieh | H04B 10/60 398/65 |
| 2010/0178057 A1* | 7/2010 | Shieh | H04L 25/0224 398/79 |
| 2010/0329670 A1* | 12/2010 | Essiambre | H04B 10/2581 398/43 |
| 2010/0329671 A1* | 12/2010 | Essiambre | G02B 6/14 398/44 |
| 2010/0329693 A1* | 12/2010 | Chen | H04B 10/85 398/147 |
| 2012/0224863 A1* | 9/2012 | Winzer | G02B 6/14 398/158 |
| 2013/0077967 A1* | 3/2013 | Woodward | H04J 14/04 398/44 |
| 2013/0136404 A1* | 5/2013 | Feuer | G02B 6/02042 385/124 |
| 2013/0148963 A1* | 6/2013 | Cvijetic | H04J 14/04 398/45 |
| 2014/0212135 A1* | 7/2014 | Ji | H04Q 11/0066 398/51 |
| 2014/0270759 A1* | 9/2014 | Djordjevic | H04L 1/0043 398/44 |
| 2014/0286648 A1* | 9/2014 | Buelow | G02B 6/2808 398/143 |
| 2014/0314410 A1* | 10/2014 | Mumtaz | H04B 10/2581 398/65 |

OTHER PUBLICATIONS

Belfiore J.C. et al. Apr. 2005, The golden code: a 2×2 full-rate space-time code with non-vanishing determinants, IEEE Transactions of information Theory, 51(4):1432-1436.

Biglieri E. et al., Feb. 2009, On fast-decodable space-time block codes, IEEE Trans. on Inf, Theory, 55(2):524-530.

Boutros J. et al., 2003, Soft-input soft-output lattice sphere decoder for linear channels, Proc. of the IEEE Globecom 2003, pp. 1583-1587.

Damen M.O. et al., Oct. 2003, Linear threaded algebraic space-time constellations, IEEE Trans. on Information Theory, 49(10):2372-2388.

Elia P. et al., Nov. 2007, Perfect space-time codes for any number of antennas, IEEE Trans. Inf. Theory, 55(11):3853-3868.

Glesk et al., May 2008, Incoherent Ultrafast OCDMA Receiver Design with 2 ps All-Optical Time Gate to Suppress Multiple-Access Interference, IEEE Journal of Selected Topics in Quantum Electronics, 14(3):861-867.

Iverson K et al., Jan. 1996, Time/wavelength coding for diffuse infrared communication systems with multiple optical carriers, Proceedings of SPIE, 2593:204-212.

Leibrich J. et al., Feb. 2002, CR-RZ-DPSK for suppression of XPM on dispersion-managed long-haul optical WDM transmission on standard single-mode fiber. IEEE Photonics Technology Letters, 14(2):155-157.

Luzzi L. et al., Sep. 2010, Augmented Lattice Reduction for MIMO decoding. IEEE Transactions on Wireless Communications, 9(9):2853-2859.

Oggier F. et al., Sep. 2006, Perfect space-time block codes, IEEE Trans. Inf. Theory, 52(9):3885-3902.

Ray A. et al., Jun. 28-Jul. 3, 2009, Ideal Structure of the silver code, Proc. of ISIT 2009, Seoul, pp. 2818-2822.

Rekaya Ben-Othman, G. et al., Oct. 2008, The spherical bound stack decoder, IEEE International Conf. (WiMob), Avignon, France, pp. 322-327.

Rekaya Ben-Othman, G.. et al., Nov. 6, 2008, Hard and soft spherical-bound stack decoder for MIMO systems, IEEE International Conference on Wireless & Mobile Computing, Networking & Communication, 30 pp.

Sarkiss et al., Jun. 2011, Construction of new delay-tolerant space-time codes, IEEE Trans. on Information Theory, 57(6):3567-3581.

Yang S. et al., Jul. 9-14, 2006, Perfect space-time block codes for parallel MIMO channels, IEEE International Symposium on Information Theory (ISIT), Seattle, USA, pp. 1949-1953.

Yen C.T. et al., Jan. 2009, Realization of OSW/AWG-based bipolar wavelength-time optical CDMA for wired-wireless transmissions, Optical Fiber Technology, 15(1):74-82.

International Search Report for International Application No. PCT/EP2012/062124 dated Aug. 8, 2012.

Tarighat et al. "Fundamentals and challenges of optical multiple-input multiple-output multimode fiber links [Topics in Optical Communications]." IEEE Communications Magazine. 45(5):57-63 (May 1, 2007).

Winzer et al. "Outage calculations for spatially multiplexed fiber links." Optical Fiber Communication Conference 2011. Technical Digest. OFC/NFOEC, IEEE, Mar. 6, 2011, pp. 1-3.

\* cited by examiner

SYSTEM FOR TRANSMISSION OVER A MULTI-MODE AND/OR MULTI-CORE OPTICAL FIBER

RELATED APPLICATIONS

This application is a U.S. National Phase of International Application No.: PCT/EP2012/062124, filed Jun. 22, 2012, which claims the benefit of French Patent Application No. 11 55537 filed Jun. 23, 2011, each of which is incorporated by reference in their entirety.

FIELD OF THE INVENTION

The present invention relates in a general manner to the field of optical telecommunications, and more particularly those using multi-mode or multi-core type optical fibers.

BACKGROUND

Optical transmissions over long distances (several hundred to several thousands of km) use monomode optical fibers. These offer the advantage of not exhibiting modal dispersion (apart from polarization modal dispersion) and of being able to withstand high outputs of several tens of Gbits/s per wavelength, and to do so for a plurality of wavelengths.

Nevertheless, for transmissions over short distances, particularly for wide band local area networks (LANs), multi-mode or multi-core fibers constitute a particularly interesting alternative because they make it possible to use low cost components (plastic or POF fibers).

Silica multi-mode fibers have a core of large diameter allowing the propagation of several guided modes, noted $L_{lp}$ for a rectilinear polarization where l is the azimuthal mode index and p the radial mode index. The mode $LP_{01}$ is the fundamental mode, the only one able to propagate in a monomode fiber. The total number of modes $L_{lp}$ depends on the optogeometric parameters (diameter of the core, particularly the index profile). The information to be transmitted is spread out on the different guided modes. The pass band of the multimode fibers is then limited by intermodal dispersion. Normal multimode fibers (core of diameter 62.5 μm instead of 8 to 10 μm for monomode fibers) enable the propagation of several hundreds of modes.

When the number of modes $L_{lp}$ is low (typically from 2 to 10 modes, corresponding to values of the normalized frequency parameter V<8)), one speaks of weakly multimode fibers or instead FMF (Few-Mode Fibers).

In their applications to optical telecommunications, FMF are exploited essentially for propagation according to the fundamental mode.

FMF fibers currently provide a good compromise between monomode fibers and standard multi-mode fibers (several hundreds of modes) in that they make it possible to attain a high pass band x length of fiber product.

The pass band of multimode fibers is generally greater than that of monomode fibers, each mode being separately modulated and the signal to be transmitted being multiplexed on the different modes. This pass band is nevertheless limited by the coupling between modes $L_{lp}$ during propagation (inter-mode crosstalk). Furthermore, on account of the imperfections and non-homogeneities of the fiber, the different modes do not undergo the same attenuation. The loss differential between the modes $L_{lp}$, also designated MDL (Mode Dispersion Loss), induces an increased sensitivity to noise sources, which can significantly limit the range of these systems.

Multi-core fibers comprise a plurality of cores (generally from 2 to 7 cores) within a common sheath. The dimension of the cores is sufficiently small to only enable a monomode propagation in each of them. Unlike multimode fibers, these thus do no exhibit modal dispersion. On the other hand, evanescent waves create a coupling between the different cores (inter-core crosstalk), the level of crosstalk is all the higher when the number of cores is high and the inter-core distance is low. Like the inter-mode coupling evoked previously, inter-core coupling limits the range of these systems.

Whatever the type of fiber, another limitation of the pass band is due to Polarization Dependent Loss or PDL and to Polarization Mode Dispersion or PMD. In fact, in an ideal fiber, two signals polarized rectilinearly according to two orthogonal axes undergo the same attenuation and propagate at the same speed. However, in practice, asymmetry defects and random imperfections of the fiber affect differently two orthogonal polarizations and lead to a degradation of the signal, which limits the maximum output that can be attained on the fiber.

An additional limitation appears when the luminous power injected into the fiber is sufficiently high to generate therein non-linear effects. This will in particular be the case when one has to resort to optical signals of high intensity to compensate the attenuation of the fiber for transmission over a long distance.

This limitation appears in particular when a wavelength multiplexed transmission or WDM (Wavelength Division Multiplexing) is used.

In fact, a high intensity wave transmitted at a first wavelength can modify by Kerr effect the index of the fiber at a second wavelength close to the first. More generally, when two waves propagate in an optical fiber, one observes a phase modulation of one as a function of the intensity of the other and vice versa. This phenomenon, known as Cross Phase Modulation or XPM, is all the more sensitive when the luminous intensities in play are important and when the wavelengths are close. It thus affects in the first instance WDM systems with high spectral density, also known as DWDM (Dense WDM), operating over a long transmission distance (long haul). This phenomenon is particularly marked when both optical signals at low output, intensity modulated, by OOK (On Off Keying) modulation, and optical signals at high output, phase (PSK) and/or amplitude (QAM) modulated propagate in the fiber. The signal to noise ratio upon reception of these phase and/or amplitude modulated signals will be all the more degraded when their spectral efficiency, or in an equivalent manner, their order of modulation, is higher.

The basic problem of the invention is to become free of the limitations respectively due to intermodal crosstalk and to inter-core crosstalk.

A first subsidiary problem is moreover to become free of the phenomenon of polarization dependent loss (PDL)/polarization modal dispersion (PMD) when the system for transmission uses polarization multiplexing.

A second subsidiary problem is moreover to become free of crossed phase modulation (XPM) when the system for transmission uses wavelength multiplexing.

SUMMARY OF CERTAIN INVENTIVE ASPECTS

The present invention is defined by a transmitter for optical telecommunication system on a weakly multimode fiber, the transmitter comprising:
  an encoder, known as space-time encoder, transforming each block of symbols to be transmitted $d_1, \ldots, d_M$ into a code matrix, each element of said matrix being relative to a time of use and to a propagation mode of the weakly multimode fiber;

a plurality of modulators respectively associated with the different propagation modes, each modulator modulating a laser beam for a time of use, by means of an element of the corresponding matrix;

each of the beams thereby modulated being injected into the weakly multimode fiber to propagate therein according to a separate mode.

According to a second embodiment, said modulators form a plurality of couples, each couple corresponding to a propagation mode in the multimode fiber, a first modulator of a couple modulating a first beam polarized according to a first direction by means of a first element of the code matrix, a second modulator of said couple modulating a second beam polarized according to a second direction, orthogonal to the first, by means of a second element of the code matrix, the first and second polarized and thereby modulated beams being combined, the resulting beam being injected into the weakly multimode fiber to propagate therein according to a separate mode.

According to a third embodiment, said modulators form a plurality M of groups, each group of modulators being associated with a separate propagation mode of the multimode fiber, the modulators of a same group modulating respectively a plurality P of beams of separate wavelengths by means of a plurality of elements of the code matrix, the beams thereby modulated by the modulators of a group being combined and the resulting beam being injected into the fiber to propagate therein according to the propagation mode associated with said group.

The code matrix may in particular be that of a code with parallel MIMO channel of dimension (P,M×M).

According to a combination of the second and third embodiments, said modulators form a plurality of groups, each group of modulators being associated with a separate propagation mode of the multimode fiber, said group splitting into a first sub-group corresponding to a first polarization direction, and a second sub-group corresponding to a second polarization direction, orthogonal to the first direction, the modulators of the first sub-group modulating respectively beams of separate wavelengths, polarized according to the first polarization direction, by means of a plurality of first elements of the code matrix, and the modulators of the second sub-group modulating respectively beams of same wavelengths, polarized according to the second polarization direction, by means of a same plurality of second elements of the code matrix, the beams of a same group being combined and the resulting beam being injected into the fiber to propagate therein according to the propagation mode associated with said group.

The invention also relates to a transmitter according to a fourth embodiment. This transmitter is intended for an optical telecommunication system on a multi-core fiber and comprises:

an encoder, known as space-time encoder, transforming each block of symbols to be transmitted $d_1, \ldots, d_M$ into a code matrix, each element of said matrix being relative to a time of use and to a core of the multi-core fiber;

a plurality of modulators respectively associated with the different cores, each modulator modulating a laser beam during a time of use, by means of an element of the corresponding matrix;

each of the beams thereby modulated being injected into a separate core of the multi-core fiber.

According to a fifth embodiment, said modulators form a plurality of couples, each couple corresponding to a core of the multi-core fiber, a first modulator of a couple modulating a first beam polarized according to a first direction by means of a first element of the code matrix, a second modulator of said couple modulating a second beam polarized according to a second direction, orthogonal to the first, by means of a second element of the code matrix, the first and second polarized and thereby modulated beams being combined, the resulting beam being injected into a separate core of the multi-core fiber.

According to a sixth embodiment, said modulators form a plurality of groups, each group of modulators being associated with a separate core of the multi-core fiber, the modulators of a same group modulating respectively beams of separate wavelengths by means of a plurality of elements of the code matrix, the beams thereby modulated by the modulators of a group being combined and the resulting beam being injected into a separate core of the multi-core fiber.

The code matrix may be as previously that of a code with parallel MIMO channel of dimension (P,M×M).

According to a combination of the fifth and sixth embodiments, said modulators form a plurality of groups, each group of modulators being associated with a separate core of the multi-core fiber, said group splitting into a first sub-group corresponding to a first polarization direction, and a second sub-group corresponding to a second polarization direction, orthogonal to the first direction, the modulators of the first sub-group modulating respectively beams of separate wavelengths, polarized according to the first polarization direction, by means of a plurality of elements of the code matrix, and the modulators of the second sub-group modulating respectively beams of same wavelengths, polarized according to the second polarization direction, by means of a same plurality of second elements of the code matrix, the beams of a same group being combined and the resulting beam being injected into a separate core of the multi-core fiber.

According to a variant, the elements of the matrix of the code are subjected to an OFDM modulation upstream of the modulators.

The matrix of the code is that of a perfect code, a silver code or a golden code. It may also be that of an asynchronous space-time code.

The invention further relates to a receiver for optical telecommunication system on multi-mode fiber, said receiver being intended to receive a block of symbols, said plurality of modes being spatially demultiplexed at the output of said fiber, the modes thereby demultiplexed being respectively demodulated by a plurality of demodulators, each demodulator providing a decision variable at each time of use of the fiber, a lattice decoder being adapted to receive said decision variables during a plurality of uses of the fiber and to deduce therefrom an estimation of the symbols of said block.

According to a second embodiment, said receiver is intended to receive a block of symbols, in which at the output of the fiber, the beams from the different cores are respectively demodulated by a plurality of demodulators, a demodulator providing a decision variable at each time of use of the fiber, a lattice decoder being adapted to receive said decision variables during a plurality of uses of the fiber and to deduce therefrom an estimation of the symbols of said block.

If needs be, an OFDM demodulation may be provided downstream of the lattice decoder.

The lattice decoder may be a sphere decoder, or instead a spherical bound stack decoder.

BRIEF DESCRIPTION OF THE DRAWINGS

Other characteristics and advantages of the invention will become clear on reading the preferential embodiments of the invention and by referring to the appended figures, among which.

DETAILED DESCRIPTION OF PARTICULAR EMBODIMENTS

The basic idea of the invention is to use a technique similar to that of space-time coding in multi-antenna or MIMO (Multiple In Multiple Out) systems to be free of phenomena of intermodal and inter-core crosstalk.

Figure 1A:
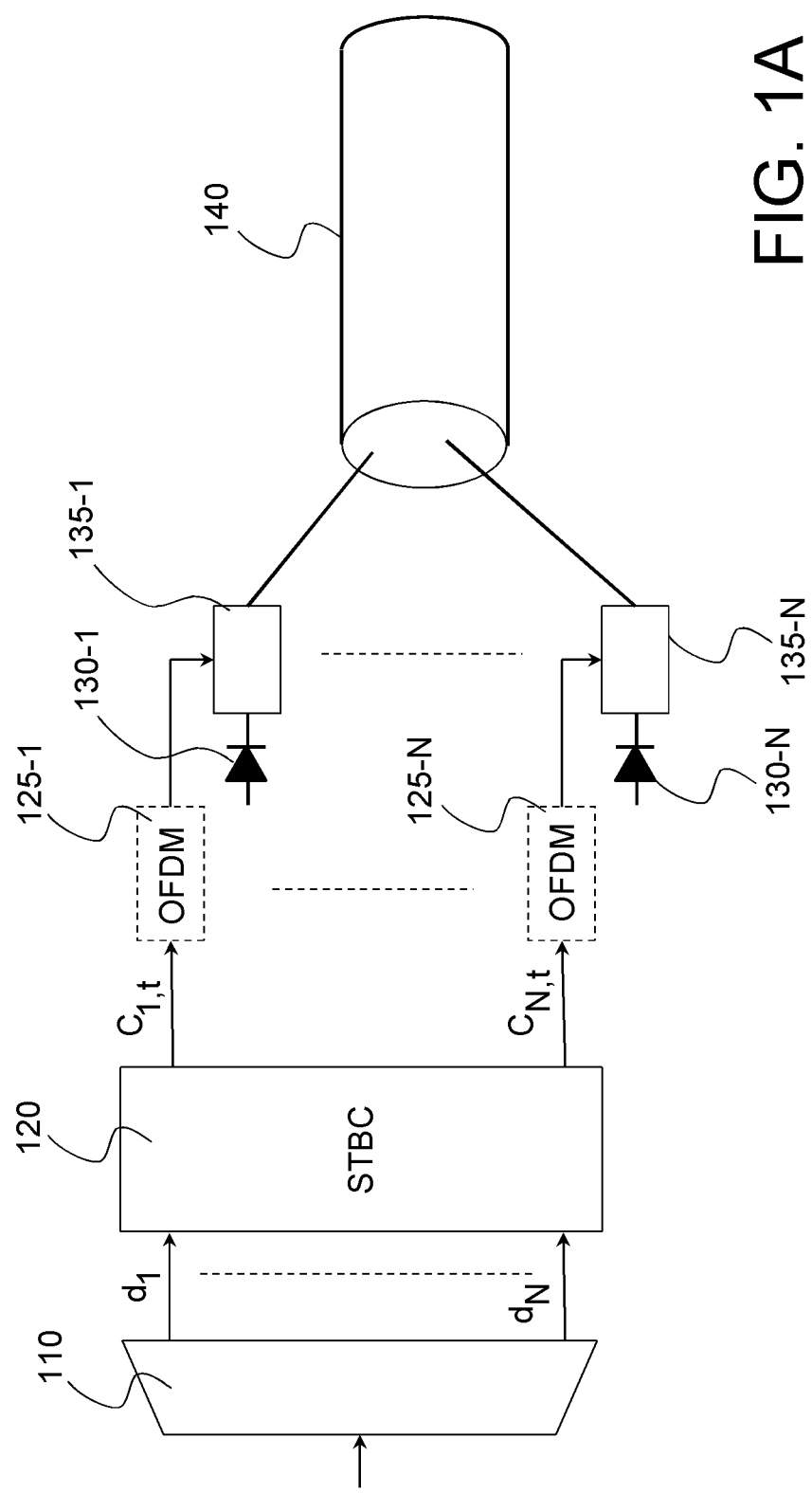
FIGS. 1A and 1B represent respectively the transmitter and the receiver of a system for optical transmission on multi-mode fiber according to a first embodiment of the invention.

More precisely, FIG. 1A represents the transmitter of a system for optical transmission on multi-mode fiber, according to a first embodiment of the invention. This fiber is preferably weakly multimode, in other words allows the propagation of 2 to 10 modes within its core.

We will assume that the transmitter has to transmit a block of data during a TTI (Time Transmission Interval). The information symbols to be transmitted will be noted $d_1$ to $d_M$. The flow of data is demultiplexed in 110, so that the information symbols $d_1$ to $d_M$ are present at the input of the space-time encoder 120. This encoder associates with each block or vector of symbols $(d_1, \ldots, d_M)$ a matrix C of size N×T, hereafter designated space-time matrix:

$$C = \begin{pmatrix} c_{1,1} & c_{1,2} & \ldots & c_{1,T} \\ c_{2,1} & c_{2,2} & \ldots & c_{2,T} \\ \vdots & \vdots & \ddots & \vdots \\ c_{N,1} & c_{N,2} & \ldots & c_{N,T} \end{pmatrix} \quad (1)$$

where the coefficients $c_{n,t}$, n=1, ..., N, t=1, ..., T (with N≥2 and T≥2) of the code are generally speaking complex coefficients depending on information symbols, N is the number of modes used, T is an integer indicating the time extension of the code, in other words the number of uses of the channel, to be specific the fiber.

The system for optical transmission comprises N lasers 130-n, n=1, ..., N, of same wavelength or instead alternatively a single laser, the beam of which is split into N separate beams. In all cases, the beams are respectively modulated by the different outputs of the space-time encoder. More precisely, at time t, the coefficient $c_{n,t}$ modulates the optical signal of the laser 130-n by means of the modulator 135-n, for example a Mach-Zehnder modulator, known per se. The modulation in question is a phase and/or amplitude modulation. The types of modulation used for the different optical signals are not necessarily identical.

The optical signals thereby modulated each excite a mode of the multi-mode fiber 140. This selective excitation may be carried out either by means of an optical device in free space, or by means of a multiplexer in guided optics.

The N modes used may represent all of the modes of the optical fiber. For example, the optical fiber may be weakly multi-mode with N=3 or N=5 modes.

Alternatively, the N modes used are chosen from those that are the most affected by intermodal crosstalk, the other modes being able to withstand a direct modulation, in other words without prior space-time coding.

Figure 1B:
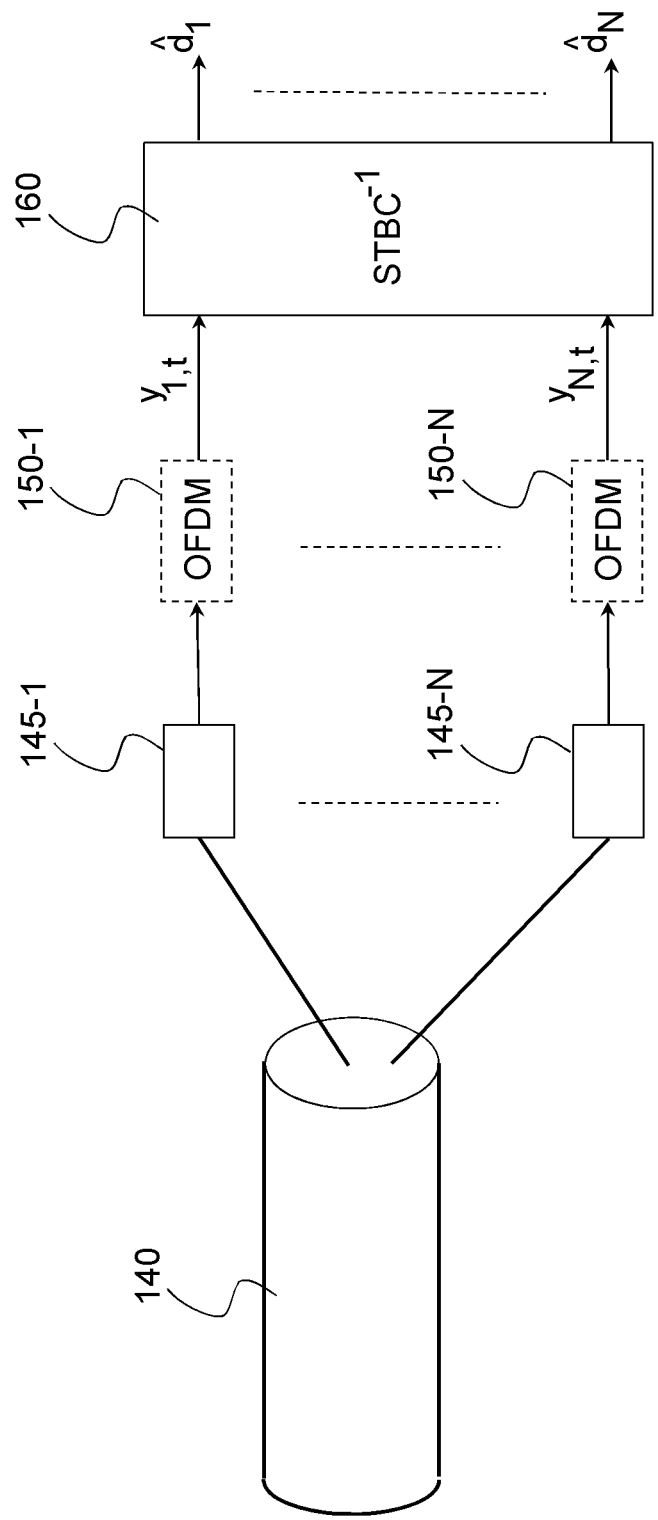

At the level of the receiver, as illustrated in FIG. 1B, the different modes are spatially demultiplexed by a device in free space at the output of the optical fiber 140. The optical signals are respectively demodulated in the demodulators 145-n, n=1, ..., N to provide, at the instant t, soft symbols, also designated hereafter decision variables $y_{n,t}$ n=1, ..., N. These decision variables are then decoded by the space-time decoder 160. More precisely, the space-time decoder uses the decision variables $y_{n,t}$ n=1, ..., N, t=1, ..., T relative to a same time interval and performs a lattice decoding, in a manner known per se, to deduce therefrom the symbols $\hat{d}_1, \ldots, \hat{d}_M$.

In a manner similar to a conventional radiofrequency MIMO system, the system can convey an output equal to N times the output of a corresponding monomode fiber.

The embodiment described above assumes that intermodal dispersion is low, in other words that the differences between the propagation times of the different modes are low. In this case, the decision variables $y_{n,t}$ may be sampled in a synchronous manner at the input of the space-time decoder.

Nevertheless, when intermodal dispersion is no longer negligible, in other words when the propagation time difference is no longer small with respect to the sampling period, one resorts to a OFDM (Orthogonal Frequency Division Multiplexing) modulation downstream of the space-time encoder 120 and, correlatively, to a OFDM demodulation upstream of the space-time decoder 160.

More precisely, this variant has been represented in dotted lines in FIG. 1A. Each OFDM modulator 125-n transforms the block of coefficients $c_{n,t}$, t=1, ..., T, or a plurality of such successive blocks, into a OFDM symbol which modulates the optical signal of the laser 130-n. In a symmetrical manner, the output of the optical demodulator 150-n is connected to the input of a demodulator OFDM 155-n which then supplies the decision variable $y_{n,t}$. The interest of using an OFDM modulation is that the propagation time differences between modes are then "absorbed" by the cyclic prefixes of the OFDM symbols. The duration of the cyclic prefix is chosen greater than the maximum propagation time difference between modes. Thus, at the output of the OFDM demodulators 150-n, the decision variables $y_{n,t}$ are relative to a same instant t.

The encoder and the space-time decoders will be described successively hereafter.

In a conventional manner, the code used by the space-time encoder is characterized by its output, in other words by the number of information symbols that it transmits per channel use (PCU). In the present case, the code will be considered at maximal output if it is N times higher than the output relative to a single mode.

The space-time coding could be linear, in other words the matrix C of the code could be written in the form:

$$\text{vec}(C) = Gd \tag{2}$$

where vec(C) is the column vector obtained by concatenating the column vectors of the matrix C, $d=(d_1, \ldots, d_M)^T$ and G is a matrix of size NT×M, known as code generating matrix.

According to a first example of linear space-time coding for a transmitter using two propagation modes of the fiber, the encoding space-time matrix proposed by S. M. Alamouti in his article entitled "A transmit diversity technique for wireless communications", published in IEEE Journal on selected areas in communications, vol. 16, pp. 1451-1458, October 1998 could be used. The Alamouti code is defined by the matrix of size 2×2:

$$C = \begin{pmatrix} d_1 & -d_2^* \\ d_2 & d_1^* \end{pmatrix} \tag{3}$$

where $d_1$ and $d_2$ are two information symbols to be transmitted and $d^*_1$ and $d^*_2$ their respective conjugates.

According to a second example of embodiment of linear space-time coding, advantageously the golden code will be used as defined in the article of J. C. Belfiore et al. entitled "The golden code: a 2×2 full rate space-time code with non-vanishing determinants", the matrix of which is given by:

$$C = \begin{pmatrix} \alpha(d_1 + d_2\theta) & \alpha(d_3 + d_4\theta) \\ i\bar{\alpha}(d_3 + d_4\bar{\theta}) & \bar{\alpha}(d_1 + d_2\bar{\theta}) \end{pmatrix} \tag{4}$$

where $$\theta = \frac{1+\sqrt{5}}{2}, \bar{\theta} = \frac{1-\sqrt{5}}{2},$$

$i=\sqrt{-1}$, $\alpha=1+i(1-\theta)$, $\bar{\alpha}=1+i(1-\bar{\theta})$, where the information symbols to be transmitted $d_1$ to $d_4$ are symbols of a QAM constellation being able to be written in the form $\lambda+i\mu$ where $\lambda$ and $\mu$ are integers.

The golden code has the advantage of being at maximal output and with maximum diversity.

According to a third example of embodiment of linear space-time coding, advantageously the silver code will be used as described for example in the article of E. Biglieri et al. entitled "On fast-decodable space-time block codes" published in IEEE Trans. on Inf. Theory, pages 524-530, vol. 55, No 2, February 2009, or instead in the article of G. Rekaya Ben Othman et al. entitled "Ideal Structure of the silver code", Proc. of ISIT 2009, Seoul, Jun. 28-Jul. 3, 2009, pp. 2818-2822.

The matrix of the silver code is given by:

$$C = \begin{pmatrix} d_1 & -d_2^* \\ d_2 & d_1^* \end{pmatrix} + \begin{pmatrix} 1 & 0 \\ 0 & -1 \end{pmatrix} \begin{pmatrix} z_1 & -z_2^* \\ z_2 & z_1^* \end{pmatrix} \tag{5}$$

with $$\begin{pmatrix} z_1 \\ z_2 \end{pmatrix} = U \begin{pmatrix} d_3 \\ d_4 \end{pmatrix}$$

where U is the unit matrix defined by:

$$U = \frac{1}{\sqrt{7}} \begin{pmatrix} 1+i & -1+2i \\ 1+2i & 1-i \end{pmatrix} \tag{6}$$

The silver code also has the advantage of being at maximal output and with maximal diversity.

According to a fourth example of embodiment of space-time coding, one uses for a number N modes, a perfect code of matrix N×N, as defined in the article of F. Oggier et al. entitled "Perfect space-time block codes" published in IEEE Trans. Inf. Theory, vol. 52, no. 9, pp. 3885-3902, September 2006. It will be recalled that a perfect code has the properties of being at full output, of having a determinant that does not tend towards zero when the size of the modulation constellation tends towards infinity, in other words a gain greater than a non-zero terminal independent of the modulation constellation, of having an energy per symbol encoded (in other words per element of the matrix) of the same order as that of the symbols of the constellation, and a same average energy per symbol encoded (the average being taken on the N consecutive transmission intervals). Examples of perfect codes for any number N of wavelengths (instead of and in place of antennas) may be found in the article of P. Elia et al. entitled "Perfect space-time codes for any number of antennas" published in IEEE Trans. Inf. Theory, vol. 55, no 11, November 2007, pp. 3853-3868.

Whatever the case, whatever the space-time coding matrix used, the perturbations induced by intermodal coupling are taken advantage of by the space-time coding to reduce the sensitivity of the transmission to these perturbations.

On the receiver side, the demodulators 145-$n$ provide soft symbols $y_{n,t}$ (decision variables). The demodulation is dual with the modulation carried out at emission. When an OFDM modulation has been carried out downstream of the space-time coding, a demodulation of the OFDM symbols intervenes upstream of the space-time decoding, by means of OFDM demodulators 150-$n$, this then providing the decision variables $y_{n,t}$. For reasons of simplicity, we will omit hereafter the operation of OFDM modulation at transmission and OFDM demodulation upon reception.

The space-time decoder uses the decision variables $y_{n,t}$ $n=1, \ldots, N, t=1, \ldots, T$ relative to different successive instants of use of the fiber during a same transmission interval and carries out a lattice decoding, in a manner known per se, to deduce therefrom the symbols $\hat{d}_1, \ldots, \hat{d}_M$.

The signal received during a transmission interval, in other words during N successive uses of the channel may be represented in the matrix form:

$$Y = HC + N \tag{7}$$

where Y is the matrix of size N×T, the elements of which are the values $y_{n,t}$, $n=1, \ldots, N, t=1, \ldots, T$, C is the space-time coding matrix used upon reception, H is a matrix with complex coefficients of size N×N representative of the transmission channel, and N is a noise matrix of size N×T.

If it is assumed, without loss of generality, that the space-time coding is linear, the expression (7) becomes, in vector form:

$$\text{vect}(Y) = Fd + \text{vec}(N) \quad (8)$$

where F is a matrix of size NT×M obtained from the matrix generating the code G and of the matrix H. The coefficients of H may be estimated by the receiver by means of pilot symbols, in a manner known per se.

The expression (8) shows that if the symbols $d_1, \ldots, d_M$ belong to a QAM modulation constellation, the vector vect (Y) indeed belongs to a lattice in the absence of noise. The estimated symbols $\hat{d}_1, \ldots, \hat{d}_M$ are obtained, by means of the decoder 160, from the point of the lattice closest to vect(Y) belonging to the constellation produced.

According to a variant, the space-time decoder may be with soft outputs using for example a soft output sphere decoder of the type described in the article of J. Boutros et al. entitled "Soft-input soft-output lattice sphere decoder for linear channels", Proc. of the IEEE Globecom '03, also known as LSD (List Sphere Decoder). Such a decoder calculates the Logarithms of Likelihood Ratios, LLR, the probabilities a posteriori of the information bits, from a list of points of the lattice included in a sphere centered on a point representing the signal received or, preferably, on a point of the lattice corresponding to a first estimation in the sense of the maximum likelihood (ML estimation), in other words at the point of the constellation the closest to the signal received.

According to another variant, the space-time decoder could advantageously use a stack sphere decoder, also known as Spherical-Bound Stack Decoder, of the type described in the article of R. Ouertani et al. entitled "The spherical bound stack decoder" published in IEEE International Conf. on wireless and mobile computing, networking and communications, (WiMob), Avignon, France, October 2008 or in that of G. Rekaya Ben-Othman et al. entitled "Hard and Soft Spherical-Bound Stack decoder for MIMO systems" available on the site www.arxiv.org or instead described in the patent application FR-A-2930861. This variant exists in the form of a version with hard outputs or a version with soft outputs.

Figure 2A:
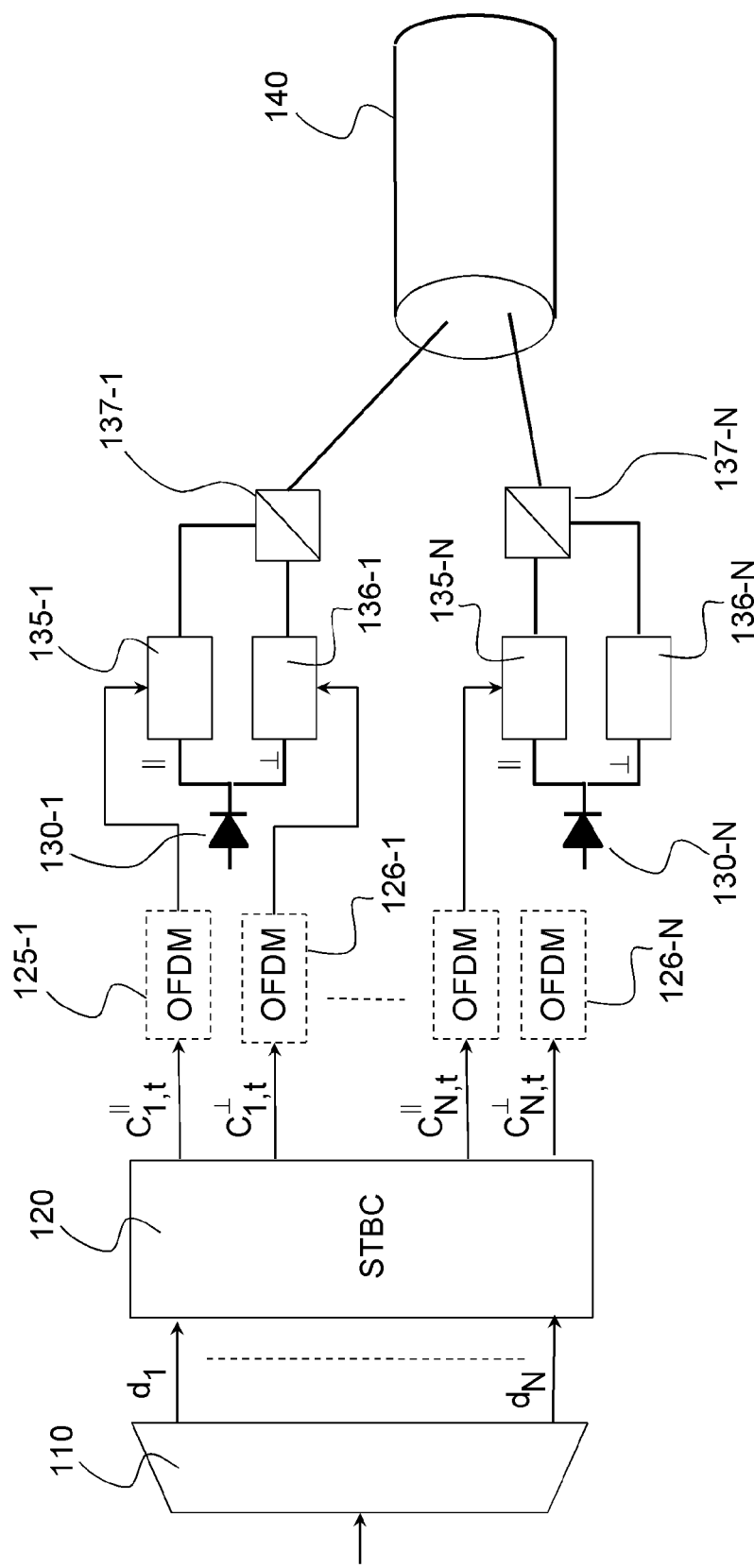
FIGS. 2A and 2B represent respectively the transmitter and the receiver of a system for optical transmission on multi-mode fiber according to a second embodiment of the invention.

FIG. 2A represents in a schematic manner a system for optical transmission on multi-mode fiber according to a second embodiment of the invention.

Elements bearing the same reference numbers have identical or similar functions.

Unlike the first embodiment, this transmitter uses a modal multiplexing and a polarization multiplexing.

More precisely, the transmitter comprises a plurality N of laser sources 130-$n$ and a same plurality of polarization splitters (not represented) each providing two orthogonal polarizations, a plurality 2N of modulators, a couple of modulators 135-$n$, 136-$n$, $n=1, \ldots, N$, modulating the signals polarized orthogonally. The polarization splitters may for example be Wollaston prisms or polarization splitting fiber couplers. According to a variant not represented, a single source laser is provided: the beam transmitted by the polarized laser source is split into two beams polarized according to two orthogonal directions. These two beams are distributed at the inputs of the modulators 135-$n$, 136-$n$, $n=1, \ldots, N$.

The space-time encoder 120 encodes a block of symbols $(d_1, \ldots, d_M)$ into a code matrix C of size 2N×T:

$$C = \begin{pmatrix} c_{1,1}^{//} & c_{2,1}^{//} & \cdots & c_{N,1}^{//} \\ c_{1,1}^{\perp} & c_{2,1}^{\perp} & \cdots & c_{N,1}^{\perp} \\ c_{1,2}^{//} & c_{2,2}^{//} & \cdots & c_{N,2}^{//} \\ c_{1,2}^{\perp} & c_{2,2}^{\perp} & \cdots & c_{N,2}^{\perp} \\ \vdots & \vdots & \vdots & \vdots \\ c_{1,T}^{//} & c_{2,T}^{//} & \cdots & c_{N,T}^{//} \\ c_{1,T}^{\perp} & c_{2,T}^{\perp} & \cdots & c_{N,T}^{\perp} \end{pmatrix} \quad (9)$$

Where the coefficients $c_{n,t}^{//}$ and $c_{n,t}^{\perp}$ are generally complex coefficients depending on the information symbols $d_1, \ldots, d_M$, the first serving to modulate a first polarization direction of the beam and the second a second polarization direction orthogonal to the first. More precisely for each mode n, a first modulator, 135-$n$, modulates the first polarization direction by means of the coefficient $c_{n,t}^{//}$ and a second modulator, 136-$n$, modulates the second polarization direction. Preferably, T=2N will be chosen. The two polarization directions thereby modulated are combined into 137-$n$ and the resulting optical signal is injected into the fiber 140 under an incidence angle chosen so as to excite a predetermined propagation mode of the fiber 140.

The fact of using two orthogonal polarizations makes it possible to attain an output two times higher than in the first embodiment.

In particular a perfect code of matrix 2N×2N as mentioned previously could be used as code. For example, for two modes and two polarizations, a perfect code of size 4×4 may be used.

Figure 2B:
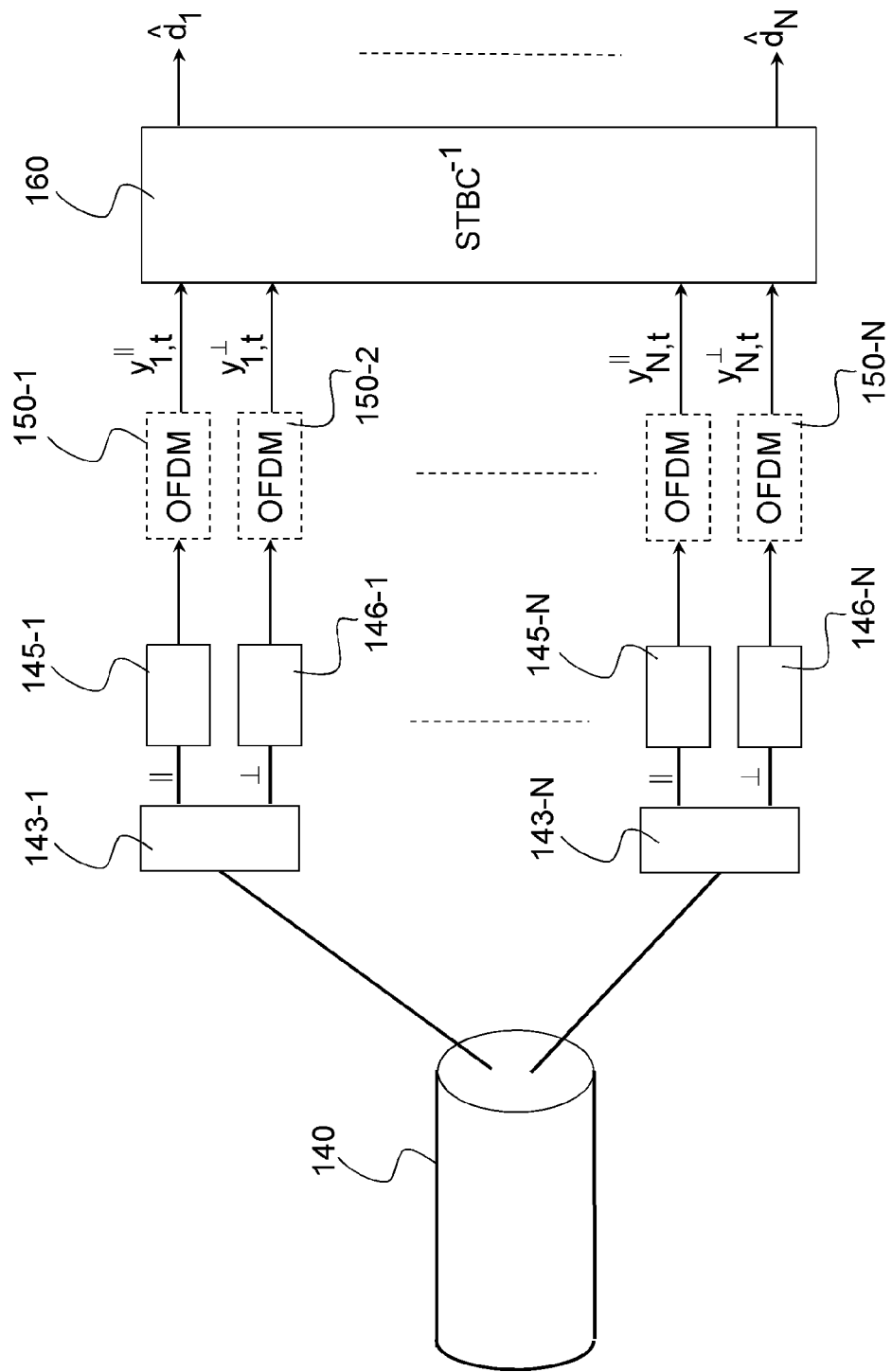

At the output of the fiber 140, as indicated in FIG. 2B, the different modes are spatially demultiplexed into 243-$n$ and the two orthogonal polarizations are split for each mode. The 2N polarized signals obtained are demodulated by 2N demodulators 145-$n$, 146-$n$, and, if needs be 2N OFDM demodulators 150-$n$, 151-$n$, to supply 2N decision variables, $y_{n,t}^{//}$ and $y_{n,t}^{\perp}$, $n=1, \ldots, N$. These 2N decision variables are provided to the space-time decoder 160.

The space-time decoder 160 uses the 2N decision variables $y_{n,t}^{//}$, $y_{n,t}^{\perp}$ $n=1, \ldots, N$, $t=1, \ldots, T$ relative to a same time interval and deduces therefrom a hard estimation of the symbols received, $\hat{d}_1, \ldots, \hat{d}_M$.

As in the first embodiment, the decoder 160 implements a lattice decoding with the same variants as those described above.

Finally, an OFDM modulation may be provided downstream of the space-time coding (OFDM modulators 125-1 to 125-N) and a corresponding OFDM demodulation upstream of the space-time decoding.

Figure 3A:
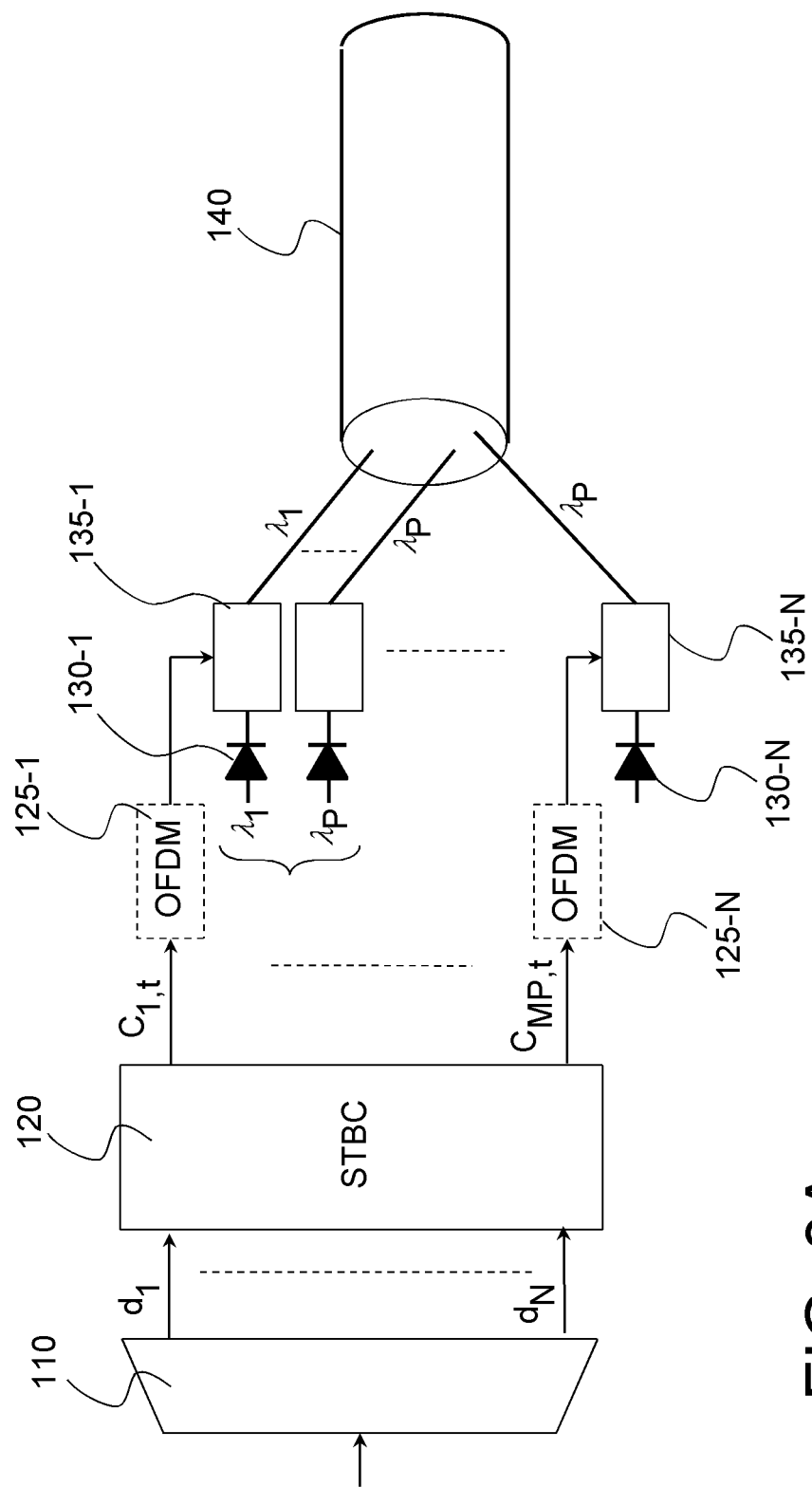
FIGS. 3A and 3B represent respectively the transmitter and the receiver of a system for optical transmission on multi-mode fiber according to a third embodiment of the invention.

FIG. 3A represents the transmitter of a system for optical transmission on multimode fiber according to a third embodiment of the invention.

Unlike the first and second embodiments, the third embodiment uses a plurality of wavelengths.

In the system illustrated in FIG. 3A, the lasers 130-$n$ do not all have the same wavelength. A plurality M of modes is here combined with a plurality P of wavelengths, each mode being associated with P wavelengths with N=MP. Advantageously, P lasers of separate wavelengths will be provided and the beam of each laser will be distributed on the inputs of M modulators.

The space-time coding (in 120) will use advantageously a code for parallel MIMO channel. It will be recalled that a parallel MIMO channel is constituted by the parallel concatenation of a plurality of elementary channels. For example, a MIMO OFDM channel using a multiplex of P sub-carriers may be considered as the putting in parallel of P elementary MIMO systems. Advantageously, the codes for parallel MIMO channel are those described in the article of S. Yang et al. entitled "Perfect space-time block codes for parallel MIMO channels", published in ISIT 2006 Proc., Seattle, pages 1949-1953, incorporated here by reference. The codes for parallel MIMO channel call upon a double extension cyclic on the body □ of the rationals, a first extension K of degree M on □ and a second extension F of degree P on K. For example, if the system of FIG. 3A implements M=2 modes and P=2 wavelengths, one could use the code for parallel MIMO channel (P,M×M) defined by the matrix:

$$x = \begin{pmatrix} \Xi & 0 \\ 0 & \tau(\Xi) \end{pmatrix} \quad (10)$$

where:

$$\Xi = \begin{pmatrix} \alpha(d_1 + d_2\zeta_8 + d_3\theta + d_4\zeta_8\theta) & \alpha(d_5 + d_6\zeta_8 + d_7\theta + d_8\zeta_8\theta) \\ \zeta_8\bar{\alpha}(d_5 + d_6\zeta_8 + d_7\bar{\theta} + d_8\zeta_8\bar{\theta}) & \bar{\alpha}(d_1 + d_2\zeta_8 + d_3\bar{\theta} + d_4\zeta_8\bar{\theta}) \end{pmatrix} \quad (11)$$

where $d_i$, i=1, . . . , 8 are the information symbols to be transmitted (for example the symbols of a QAM or HEX constellation), $$\theta = \frac{1 + \sqrt{5}}{2}, \bar{\theta} = \frac{1 - \sqrt{5}}{2},$$

$i=\sqrt{-1}$, $\alpha=1+i(1-\theta)$, $\bar{\alpha}=1+i(1-\bar{\theta})$, $$\zeta_8 = e^{i\frac{\pi}{4}}$$

and $\tau$ is the operator on the extension □($\zeta_8, \sqrt{5}$) transforming $\zeta_8$ into $-\zeta_8$.

Those skilled in the art will understand that, according to a more complex variant, the plurality of modes may be conjugated with a plurality of modes and two orthogonal polarizations, a coefficient at the output of the space-time encoder then modulating at the instant t a mode at a wavelength, polarized according to one of the two polarization directions. In such a case, a code for parallel MIMO channel (P,2M×2M) will be used.

Figure 3B:
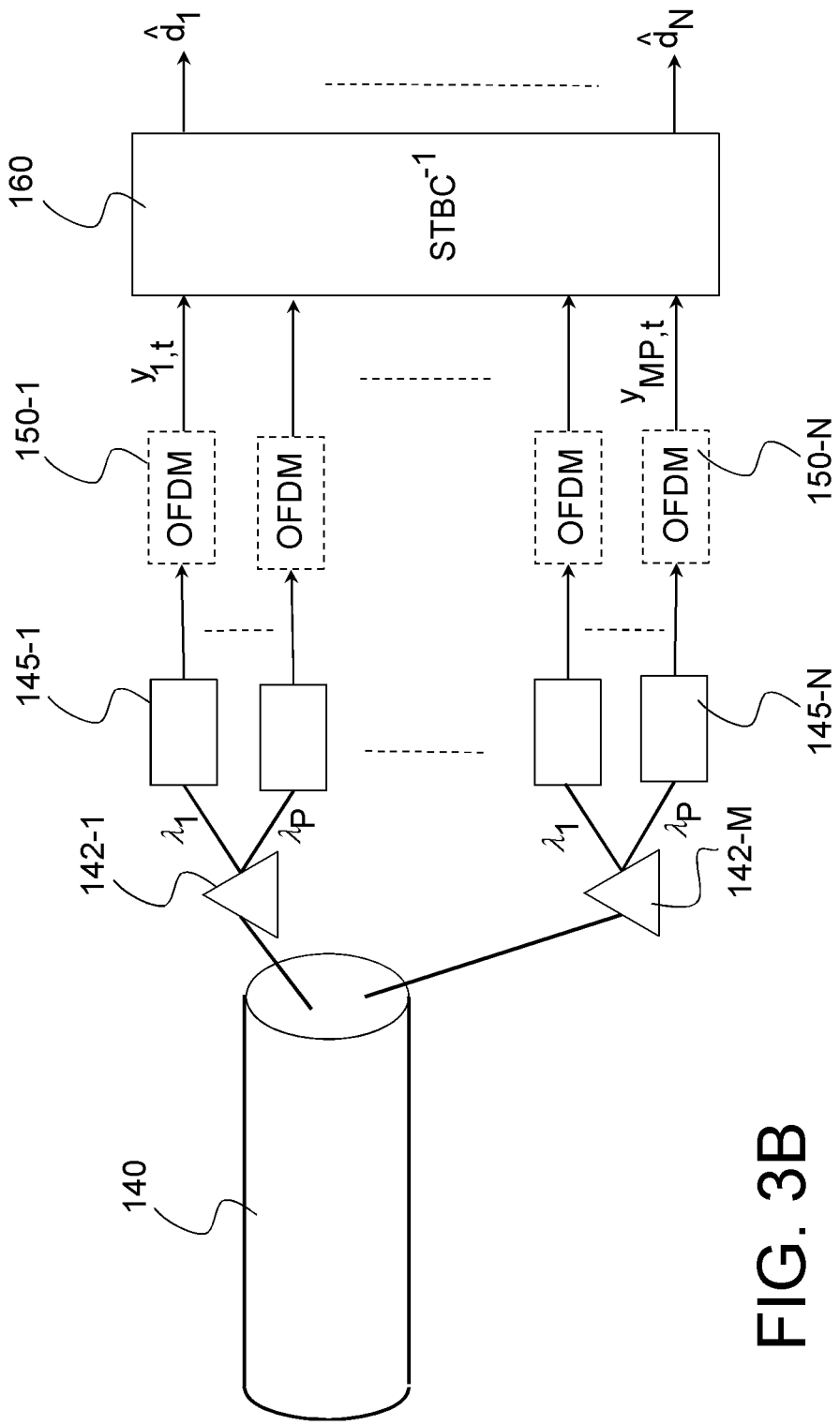

In the receiver illustrated in FIG. 3B, the modes are firstly spatially demultiplexed and the different wavelengths split by a diffraction element 142-$p$, p=1, . . . , P or instead by a battery of interferential filters. The signals obtained are then demodulated as previously to supply the MP decision variables. In the case of the aforementioned variant, analyzers moreover make it possible to split the two orthogonal polarizations. They may be situated before or after the wavelength demultiplexing.

Figure 4A:
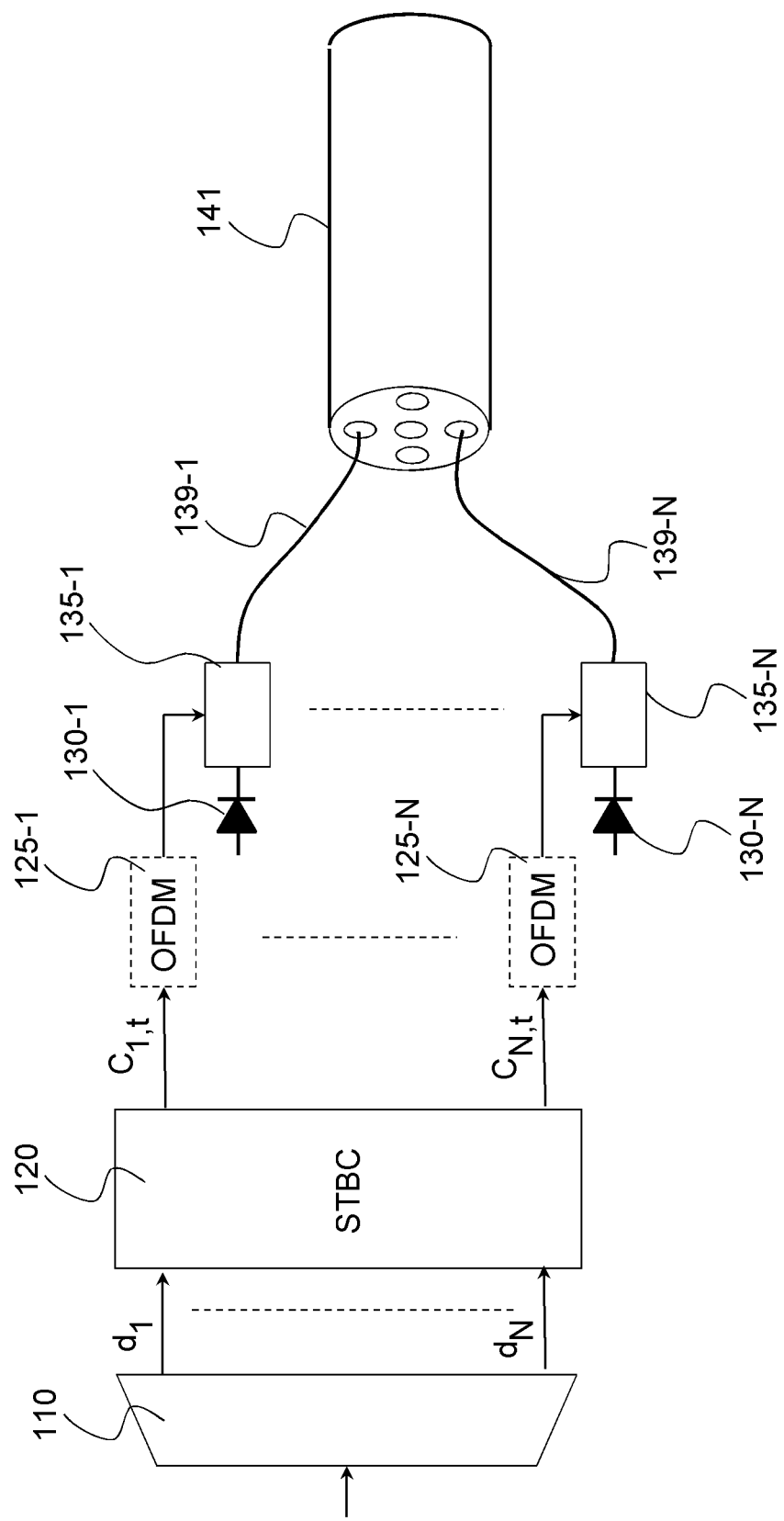
FIGS. 4A and 4B represent respectively the transmitter and the receiver of a system for optical transmission on multi-mode fiber according to a fourth embodiment of the invention.

FIG. 4A represents the transmitter of a system for optical transmission on multi-core fiber, according to a fourth embodiment of the invention.

Unlike the first embodiment, the fiber used, 141, is of multi-core type. The different beams modulated, at the output of the modulators 135-1 to 135-N, are injected into the different cores, for example by means of segments of monomode connecting fiber 139-1, . . . , 139-N or instead using microlenses.

Figure 4B:
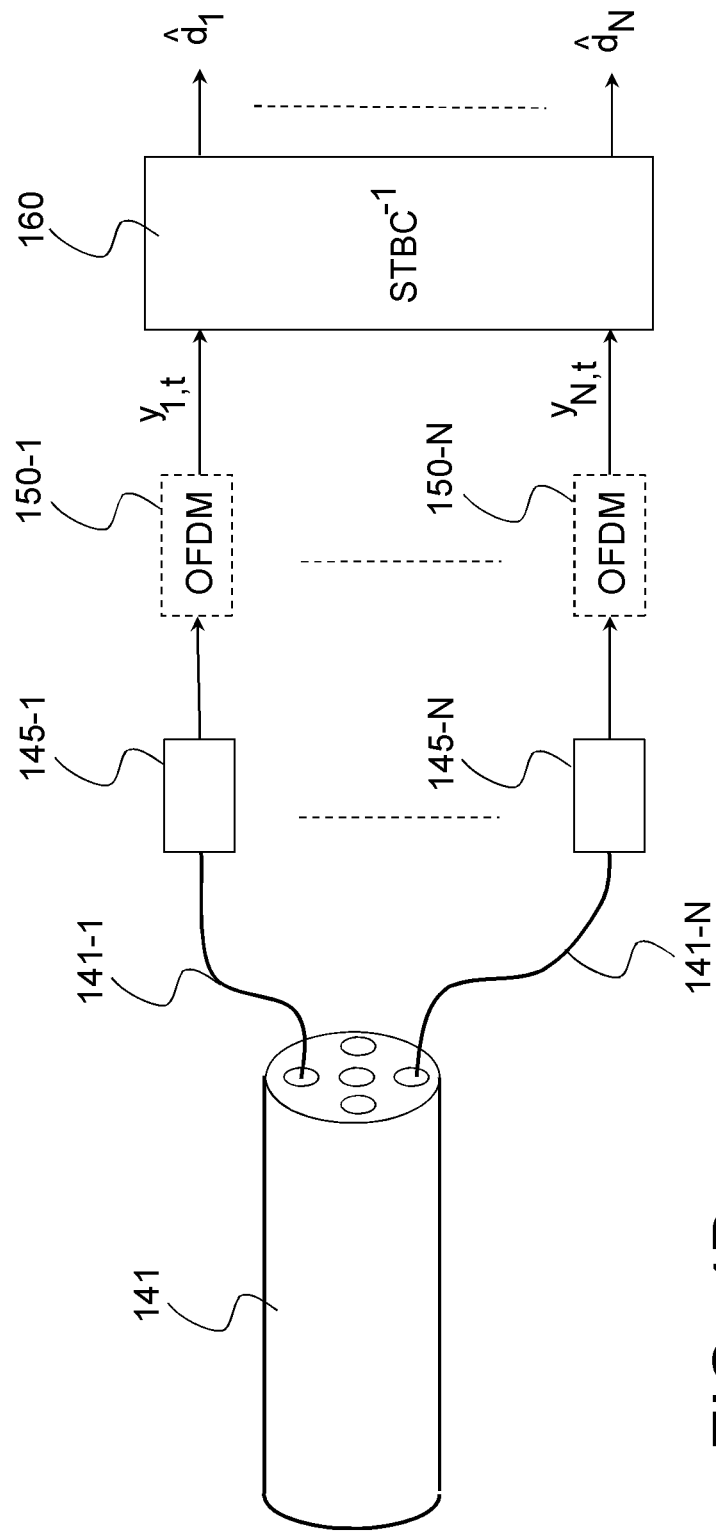

Upon reception, as represented in FIG. 4B, the beams from the different cores are conveyed to the demodulators 145-1 to 145-N, for example by means of segments of monomode fiber 141-1 to 141-N. The remainder of the receiver is identical to that of FIG. 1B.

It will be recalled that the dimensions of the cores only enable the propagation of the fundamental mode.

The space-time encoder of FIG. 4A uses the same encoding matrix (1) as the first embodiment and the space-time decoder may be realized according to the variants already described previously.

Those skilled in the art will understand that the space-time coding of the figure makes it possible to reduce the sensitivity of the transmission to optical coupling between cores.

Figure 5A:
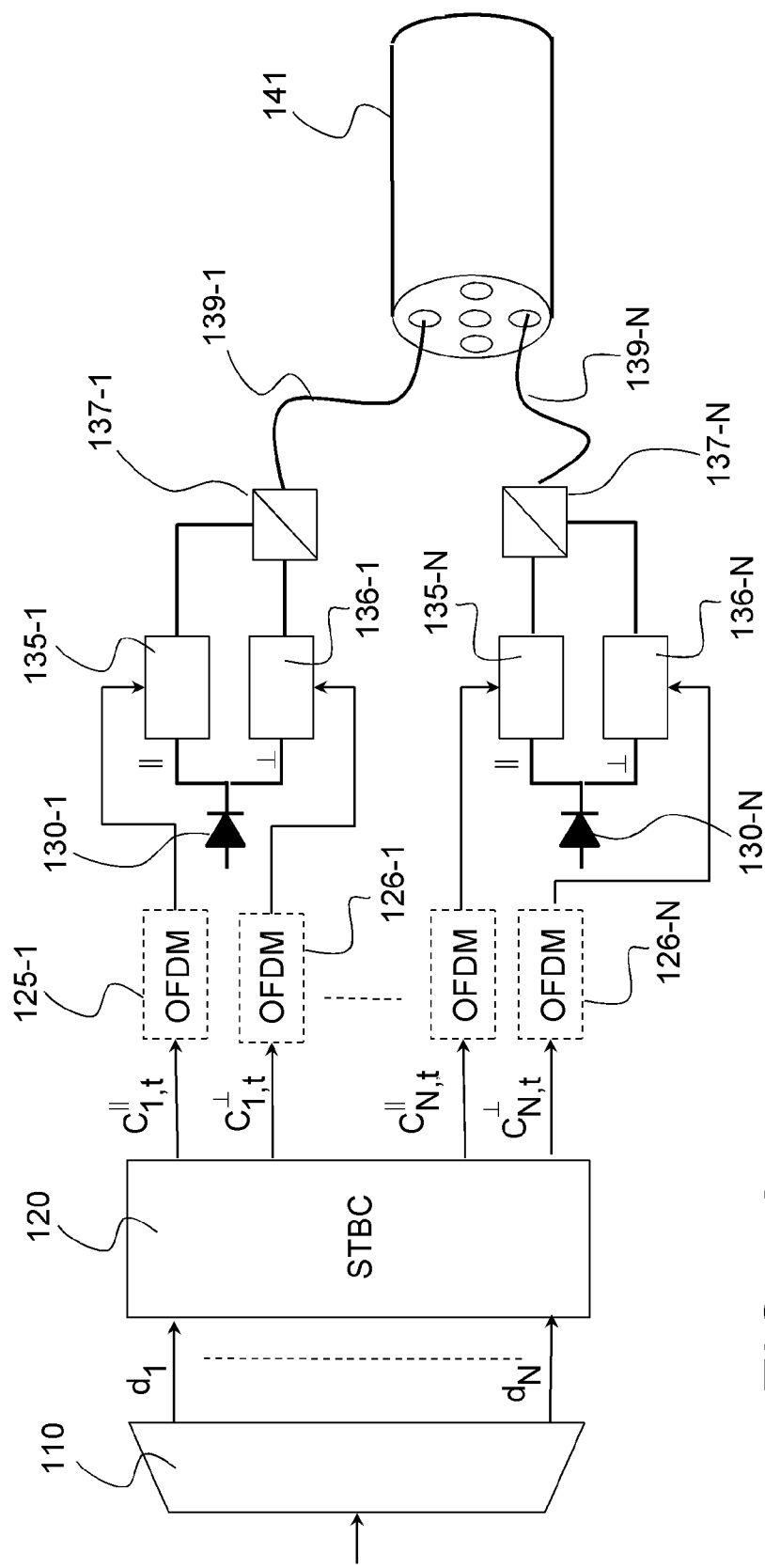
FIGS. 5A and 5B represent respectively the transmitter and the receiver of a system for optical transmission on multi-mode fiber according to a fifth embodiment of the invention.
Figure 5B:
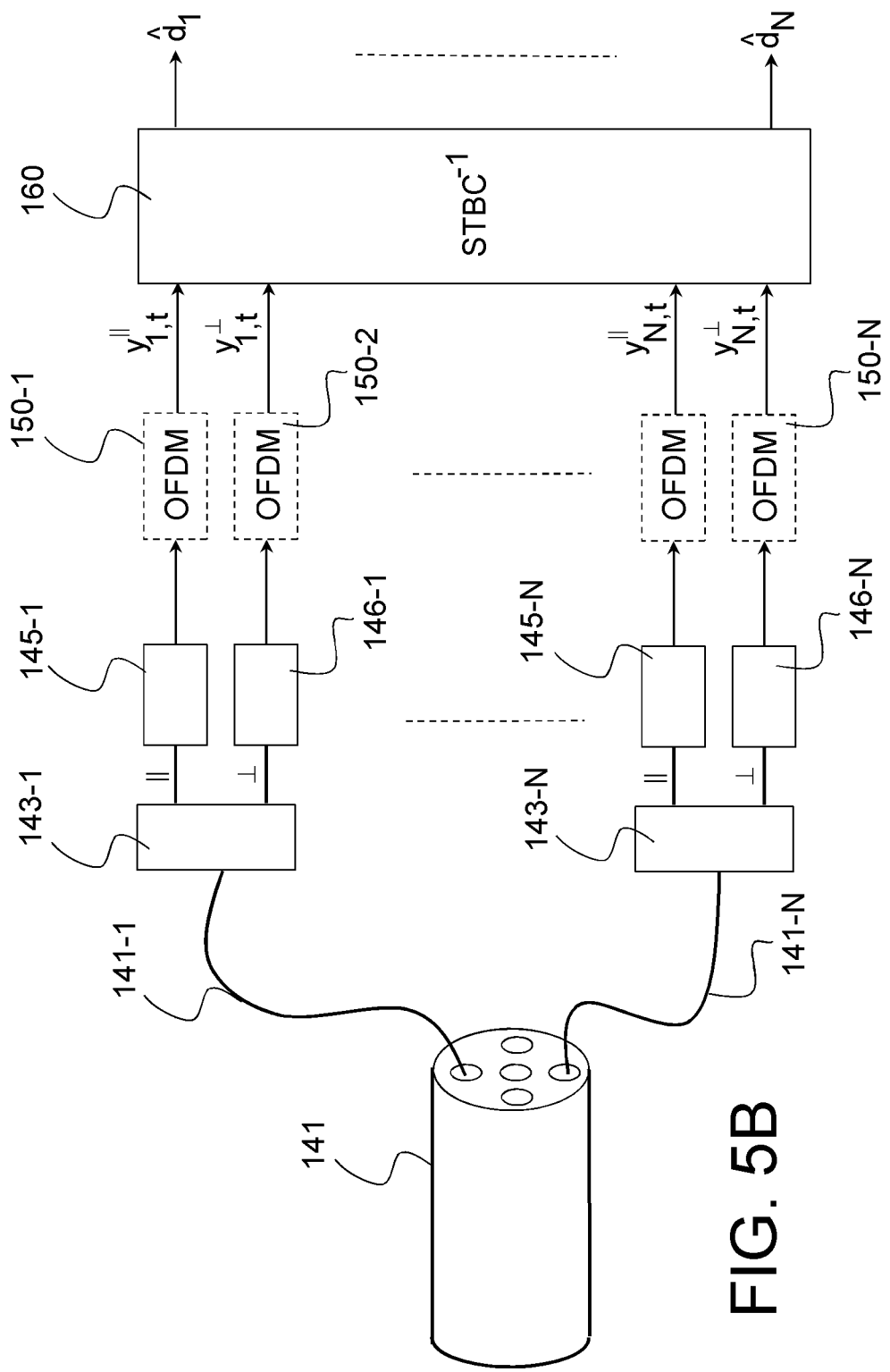

FIG. 5A represents the transmitter of a system for optical transmission on multi-core fiber, according to a fifth embodiment of the invention.

This embodiment differs from that illustrated in FIG. 4A in that it uses two orthogonal polarizations per core. The 2N outputs $c_{n,t}^{//}, c_{n,t}^{\perp}$, n=1, . . . , N of the space-time encoder modulate respectively N beams polarized according to a first direction and N beams polarized according to a second direction, orthogonal to the first. For each beam, the orthogonal polarizations thereby modulated are combined in 137-$n$, before being injected into the fiber 141. The beams transmitted by the lasers 130-1 to 130-$n$ are polarized using polarizers (not represented), for example Wollaston prisms. According to a variant not represented, a single laser is provided, followed by a polarizer, the beam polarized according to the first direction being distributed on the inputs of the modulators 135-1 and the beam polarized according to the second direction being distributed on the inputs of the modulators 136-$n$.

Upon reception, the optical signals of the different cores are conveyed by segments of monomode fiber 141-1 to 141-N to the polarizing filters 143-1 to 143-N. The orthogonal polarizations are then demodulated to supply 2N decision variables $y_{n,t}^{//}, y_{n,t}^{\perp}$, n=1, . . . , N to the space-time decoder 160, as in the second embodiment.

Figure 6A:
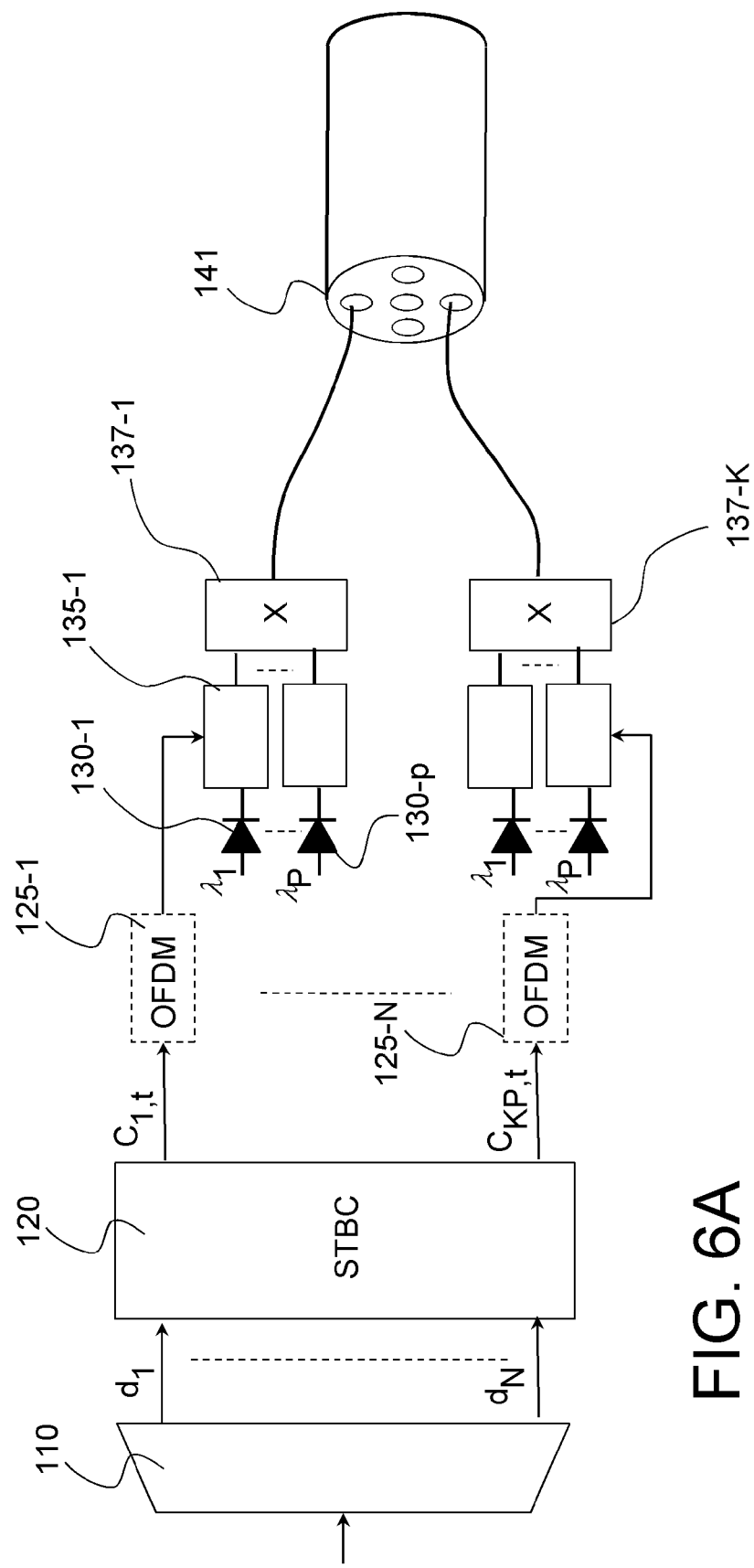
FIGS. 6A and 6B represent respectively the transmitter and the receiver of a system for optical transmission on multi-mode fiber according to a sixth embodiment of the invention.

FIG. 6A represents a transmitter of a system for optical transmission on multi-core fiber, according to a sixth embodiment of the invention.

Unlike the fourth embodiment, this uses a transmission on a plurality of wavelengths combined with a transmission on a plurality of cores of the fiber 141. Each of the K cores of the fiber receives an optical signal multiplexed on the different wavelengths. The coefficients $c_{k p,t}$, p=1, . . . , P modulate respectively P beams at the time t, the P beams thereby modulated being multiplexed in 137-$k$ and the resulting optical signal being injected into the core k of the fiber 141.

As in FIG. 3A, the space-time code of FIG. 6A may be a code for parallel MIMO channel as described in the aforementioned article of S. Yang, for example that defined by the expressions (10) and (11) for a fiber with K=2 cores and P=2 wavelengths.

Figure 6B:
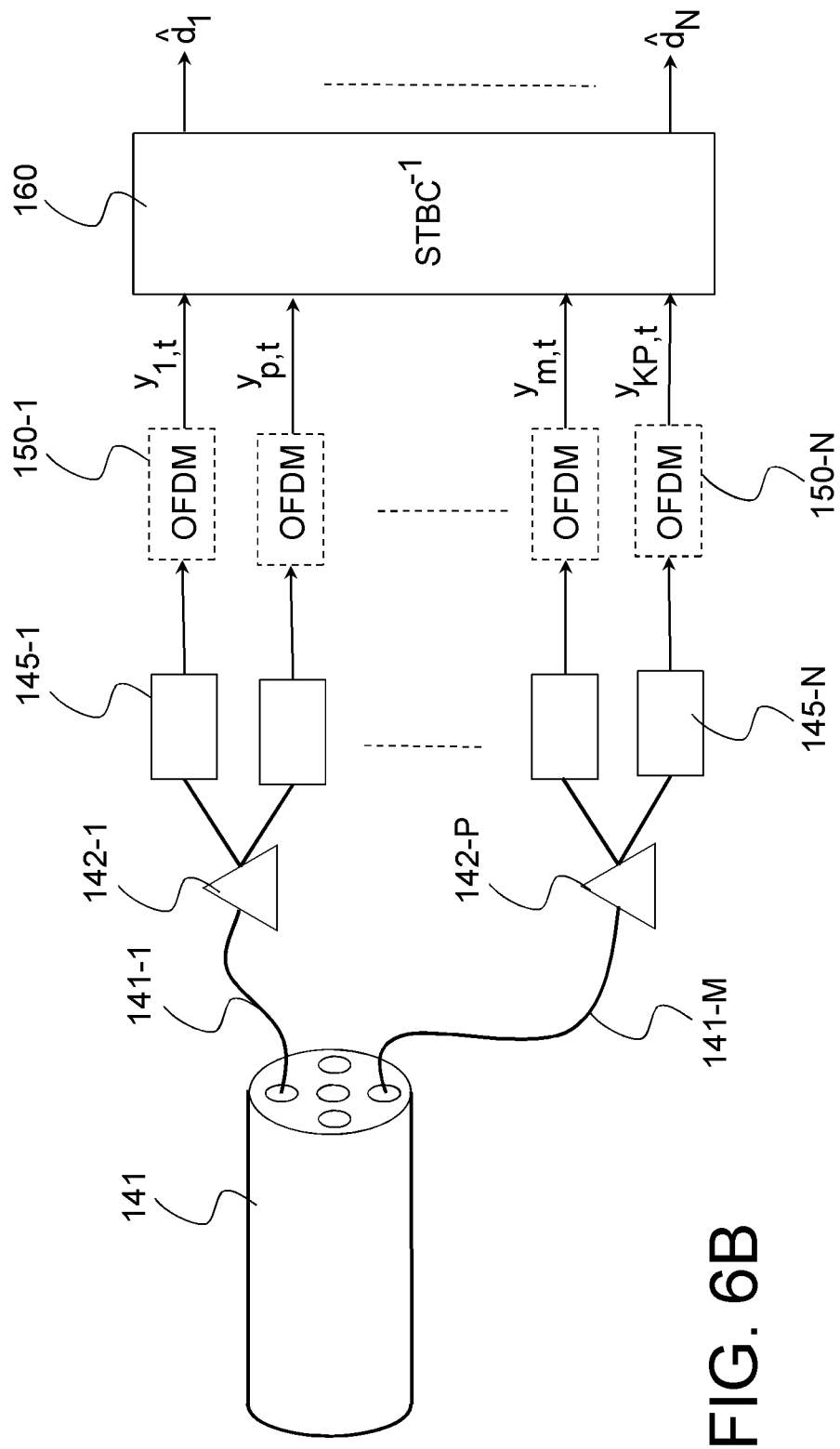

Upon reception, as illustrated in FIG. 6B, the optical signals of the different cores of the fiber 141 are respectively conveyed to the wavelength demultiplexers 141-1 to 141-$p$ (for example diffraction gratings). The optical signals at the different wavelengths from the different cores are demodulated in the demodulators 145-1 to 145-N to provide the N=KP decision variables to the space-time decoder 160.

Those skilled in the art will understand that, according to a more complex variant, the transmission via the different cores may be conjugated not only with a plurality of wavelengths and two orthogonal polarizations. In this case, a coefficient at the output of the space-time encoder modulates at the instant t an optical signal at a wavelength, polarized according to one of the two directions of orthogonal polarizations, intended for one of the cores. The multiplicity is then equal to N=2KP.

In all of the preceding embodiments, we have seen that, according to a variant, an OFDM modulation could be provided at the transmission, downstream of the space-time coding, when the propagation time difference between modes or between cores is no longer small with regard to the sampling period. In a symmetrical manner, an OFDM demodulation is then carried out upon reception upstream of the space-time decoding.

Another variant may be alternatively envisaged when the propagation time difference between modes or in the cores is not negligible. According to this variant, a family of asynchronous space-time codes is used, described in the article of M. Sarkiss et al. entitled "Construction of new delay-tolerant space-time codes" published in IEEE Trans. on Information Theory, June 2011, Vol. 57, No 6, pages 3567-3581. These space-time codes maintain their properties despite the presence of time shifts between code words received from different antennas. They are constructed using the tensor product of cyclic algebras. For example, for two modes or two cores, the code may be defined by the matrix:

$$C = \begin{pmatrix} \varepsilon_1 \omega_1 d & \varepsilon_3 \omega_3 d \\ \varepsilon_2 \omega_2 d & \varepsilon_4 \omega_4 d \end{pmatrix} \quad (12)$$

where $d=(d_1, \ldots, d_4)^T$ is the vector of the information symbols to be transmitted, and where $\varepsilon_i$, $i=1, \ldots, 4$ are coefficients equal to 1 with the exception of a single one equal to −1, and where $\omega_i$, $i=1, \ldots, 4$ are the row vectors of the matrix $\Omega$ defined by:

$$\Omega = \frac{1}{\sqrt{10}} \begin{pmatrix} \alpha & \alpha\theta_1 & \alpha\zeta_8 & \alpha\theta_1\zeta_8 \\ \overline{\alpha} & \overline{\alpha}\theta_1 & \overline{\alpha}\zeta_8 & \overline{\alpha}\theta_1\zeta_8 \\ \alpha & \alpha\theta_1 & -\alpha\zeta_8 & -\alpha\theta_1\zeta_8 \\ \overline{\alpha} & \overline{\alpha}\theta & -\overline{\alpha}\zeta_8 & -\overline{\alpha}\theta_1\zeta_8 \end{pmatrix} \quad (13)$$

$\alpha$, $\theta_1$, $\zeta_8$ having already been described previously.

What is claimed is:

1. A transmitter for an optical telecommunication system on a weakly multimode fiber, comprising:
   an encoder transforming each block of symbols to be transmitted into a code matrix, each element of the matrix being relative to a time of use and to a propagation mode of the weakly multimode fiber;
   a plurality of modulators respectively associated with the different propagation modes, each modulator modulating a laser beam during a time of use, by use of an element of the corresponding matrix, the elements of the matrix of the code being subjected beforehand to an OFDM modulation upstream of said modulators;
   each of the modulated beams being input into the weakly multimode fiber to propagate therein according to a separate mode.

2. The transmitter of claim 1, wherein the modulators form a plurality of couples, each couple corresponding to a propagation mode in the weakly multimode fiber, a first modulator of a couple modulating a first beam polarized according to a first direction by use of a first element of the code matrix, a second modulator of the couple modulating a second beam polarized according to a second direction, orthogonal to the first, by use of a second element of the code matrix, the first and second polarized and thereby modulated beams being combined into a resulting beam, the resulting beam being input into the weakly multimode fiber to propagates therein according to a separate mode.

3. The transmitter of claim 1, wherein the modulators form a plurality of groups, each group of modulators being associated with a separate propagation mode of the weakly multimode fiber, the modulators of a same group modulating respectively a plurality of beams of separate wavelengths by use of a plurality of elements of the code matrix, the beams thereby modulated by the modulators of the same group being combined into a resulting beam and the resulting beam being input into the fiber to propagate therein according to the propagation mode associated with the same group.

4. The transmitter of claim 3, wherein the code matrix is that of a code with parallel MIMO channel of dimension.

5. The transmitter of claim 1, wherein the modulators form a plurality of groups, each group of modulators being associated with a separate propagation mode of the weakly multimode fiber, each group splitting into a first sub-group corresponding to a first polarization direction, and a second sub-group corresponding to a second polarization direction, orthogonal to the first direction, the modulators of the first sub-group modulating respectively beams of separate wavelengths, polarized according to the first polarization direction, by use of a plurality of first elements of the code matrix, and the modulators of the second sub-group modulating respectively beams of same wavelengths, polarized according to the second polarization direction, by use of a same plurality of second elements of the code matrix, the beams of a same group being combined into one resulting beam and the resulting beam being input into the fiber to propagate therein according to the propagation mode associated with each group.

6. A transmitter for optical telecommunication system on a multi-core fiber, comprising:
   an encoder transforming each block of symbols to be transmitted into a code matrix, each element of said matrix being relative to a time of use and to a core of the multi-core fiber;
   a plurality of modulators respectively associated with the different cores, each modulator modulating a laser beam during a time of use, by use of an element of the corresponding matrix, the elements of the matrix of the code being subjected beforehand to an OFDM modulation upstream of said modulators;
   each of the modulated beams being input into a separate core of the multi-core fiber.

7. The transmitter of claim 6, wherein the modulators form a plurality of couples, each couple corresponding to a core of the multi-core fiber, a first modulator of a couple modulating a first beam polarized according to a first direction by use of a first element of the code matrix, a second modulator of the couple modulating a second beam polarized according to a second direction, orthogonal to the first, by use of a second element of the code matrix, the first and second polarized and thereby modulated beams then being combined into one resulting beam and the resulting beam being input into a separate core of the multi-core fiber.

8. The transmitter of claim 6, wherein the modulators form a plurality of groups, each group of modulators being associated with a separate core of the multi-core fiber, the modulators of a same group modulating respectively beams of separate wavelengths by use of a plurality of elements of the code matrix, the beams thereby modulated by the modulators of the same group being combined into a resulting beam and the resulting beam being input into a separate core of the multi-core fiber.

9. The transmitter of claim 6, characterized in that the code matrix is that of a code with parallel MIMO channel of dimension.

10. The transmitter of claim 6, wherein the modulators form a plurality of groups, each group of modulators being associated with a separate core of the weakly multimode fiber, each group splitting into a first sub-group corresponding to a first polarization direction, and a second sub-group corresponding to a second polarization direction, orthogonal to the first direction, the modulators of the first sub-group modulating respectively beams of separate wavelengths, polarized according to the first polarization direction, by use of a plurality of elements of the code matrix, and the modulators of the second sub-group modulating respectively beams of same wavelengths, polarized according to the second polarization direction, by use of a same plurality of second elements of the code matrix, the beams of a same group being combined into one resulting beam and the resulting beam being inputted into a separate core of the multi-core fiber.

11. The transmitter of claim 6, wherein the matrix of the code is that of a perfect code.

12. The transmitter of claim 6, wherein the matrix of the code is that of a silver code.

13. The transmitter of claim 6, wherein the matrix of the code is that of a golden code.

14. The transmitter of claim 1, wherein the matrix of the code is that of an asynchronous space-time code.

* * * * *